US006863534B1

(12) United States Patent
Sadka

(10) Patent No.: US 6,863,534 B1
(45) Date of Patent: Mar. 8, 2005

(54) COLOR PREFERENCE SELF-HELP SYSTEM

(75) Inventor: Dewey G. Sadka, Atlanta, GA (US)

(73) Assignee: Energia, Inc., Atlanta, GA (US)

( * ) Notice: Subject to any disclaimer, the term of this patent is extended or adjusted under 35 U.S.C. 154(b) by 364 days.

(21) Appl. No.: 09/637,544

(22) Filed: Aug. 11, 2000

(51) Int. Cl.[7] .............................................. G09B 19/100
(52) U.S. Cl. ....................................................... 434/236
(58) Field of Search ................................ 434/236, 237, 434/238, 81, 84, 98, 99; 281/15.1, 3.1; 283/114

(56) References Cited

U.S. PATENT DOCUMENTS

| | | | |
|---|---|---|---|
| 2,959,871 A | | 11/1960 | Honkavaara |
| 4,971,561 A | | 11/1990 | Krane |
| 5,029,081 A | * | 7/1991 | Kagawa .................. 708/131 X |
| 5,190,458 A | | 3/1993 | Driesener |
| 5,399,092 A | | 3/1995 | Olsen |
| 5,542,849 A | * | 8/1996 | Douglass ................ 434/236 X |
| 5,580,254 A | | 12/1996 | Ramsey |
| 5,583,763 A | | 12/1996 | Atcheson et al. |
| 5,696,981 A | | 12/1997 | Shovers |
| 5,702,253 A | * | 12/1997 | Bryce et al. ............ 434/236 X |
| 5,729,699 A | | 3/1998 | Hashimoto et al. |
| 5,790,091 A | | 8/1998 | Hashimoto |
| 5,882,203 A | * | 3/1999 | Correa et al. .......... 434/236 X |
| 5,909,220 A | | 6/1999 | Sandow |
| 5,923,885 A | | 7/1999 | Johnson et al. |
| 6,006,188 A | * | 12/1999 | Bogdashevsky et al. ..................... 704/270 X |
| 6,029,141 A | | 2/2000 | Bezos et al. |
| 6,059,724 A | * | 5/2000 | Campell et al. ........ 600/300 X |
| 6,099,319 A | * | 8/2000 | Zaltman et al. ......... 434/236 X |
| 6,116,656 A | | 9/2000 | Glassman |
| 6,549,213 B1 | * | 4/2003 | Sadka ..................... 345/593 X |
| 2002/0045154 A1 | * | 4/2002 | Wood et al. ............ 434/350 X |

OTHER PUBLICATIONS

Greenwood, P., and Thomas, D. New Age Directory of Planet Earth: The First International Body–Mind–Spirit Sourcebook. [Online], 1998 [retrieved May 14, 2002]. Retrieved from the Internet:<URL: http://www.mysticplanert.com/8diction.html>.*

Sasaki, H. Color psychology. Apr. 30, 1991 [retrieved May 14, 2002]: Retrieved from the Internet:<URL:http://www.shibuya.com/garden/colorpsycho.html>.*

Luscher, M. and Ian Scott. 1969. The Luscher Color Test. Pocket Books. pp. 1–3, 27–41, 60–189.*

Color Test [online], 1992 [retrieved on Aug. 22, 2002]. Retrieved from the Internet: <URL:http://www.robrob8.com/quizzes/color_test_html> pp. 1–2.*

Color Preference Analysis Test [online], 2000–2002 [retrieved on Aug. 22, 2002]. Retrieved from the Internet: <URL: http://negotiationtools.com/colortest.html>.*

* cited by examiner

Primary Examiner—Chanda L. Harris
(74) Attorney, Agent, or Firm—Troutman Sanders LLP

(57) ABSTRACT

A system and method for identifying patterns of human behavior based on color preferences. The system includes a plurality of color representations comprising a primary set of color representations, a secondary set of color representations, an achromatic set of color representations, and an intermediate set of color representations. At least one set of indicia, which identifies at least one human behavior, is associated with each of the color representations. One's favorite and least favorite color representations are selected to identify a pattern of human behavior.

20 Claims, 16 Drawing Sheets

YELLOW

*Knowledge is power.*

— Francis Bacon

Beyond Words

Finding common ground is the game you play best. You calm troubled situations, bridge differences. Your awareness of others' perspectives allows you to express contrary, unpopular feelings without offending anyone. By keeping people listening, you allow solutions and possibilities to unfold.

In one-on-one situations you manage to see and understand the other person's point of view. You accept what others need without imposing your own will or agenda. You accept people for who they are. You have a knack for keeping the conversation flowing and know precisely where to focus your energy. You know where it is that the other person ends and you begin.

You're a team player and enjoy the supportive role. (For example, the person behind the president.) You are flexible. Since you are not a control freak or power hungry, you're able to focus on the task at hand. You deal with the present and don't dwell on the past or obsessively plan for the future. You tend to be spiritual and life-supporting.

Key Words: Realistic, Diplomatic and Giving

Power: The wisdom to know what is needed

Motivation: Personal growth

The Lovable You

You enjoy the simple pleasures in life and you give this gift to your relationships, as well. You are at your best when those around you are not judgmental or impatient. Rigidity turns you off. Others turn you on when they refrain from speaking until all the facts are presented.

You're very generous, willing to extend yourself without expecting anything in return. However, you find it difficult to receive gifts and compliments. You end up feeling obligated. When the people closest to you want to do something special for you, they usually have to plot and plan secretly.

Allow for give and take. You make others feel important when you let them do things for you. It is important to accept kind gestures; otherwise, you'll find yourself surrounded by people who take advantage of you.

Setting Priorities

Your ability to understand everyone else's point of view is a very powerful tool in the work place. Knowing how to approach a potential client and getting the boss to listen to a new idea are among your natural talents. You have the power to establish new relationships and move up the corporate ladder. People feel they know where they stand with you and are willing to let you help them. You are happy when you're able to give of yourself.

For you, success means growing and learning. You're not overly concerned with money. You would much rather be in a position that gives you a good feeling about yourself than work at a job you hate, but which pays more. Be careful. You can become too absorbed with the different facets of projects. Constantly remind yourself of the larger picture.

Do It Right

You have the power to take in the beauty that surrounds you and really appreciate everything that life has to offer. Being an integral part of the world is the source of all your energy. You achieve personal growth and enjoy the process of living when absorbed in a task. You are at your best when shopping or relaxing.

Don't Go There

When you do things for others to avoid dealing with your own needs, you don't give yourself the time or the energy to think about your own dilemmas. The more upset you become, the more you immerse yourself in the concerns of others. In turn, you become overly docile and unable to help yourself. Your problems, of course, will not go away until you confront them.

Create Passion

Discover those places that allow your fluid, easy-going charm to resonate with people. Avoid overly structured, repressive environments.

FIG 4

YELLOW least favorite

You Are Very Determined

When you really want something, others had better get out of your way. Your sense of responsibility and urgency keeps those around you moving forward. You create a sense of purpose. You are constantly thinking, "I must do this or that." Your mind is one step ahead of everyone else's. You're on automatic pilot. This gives you the power to persuade those around you to believe in your way of doing things. After all, you look as if you know what you want, even when you're not sure.

The friends and lovers in your life sometimes take a back seat to whatever project you're involved with. But once you meet someone you're really interested in, you obsess over him or her. You want it all and you want it now. Don't be so forceful. Accept people for who they are, not who you want them to be. If you stop trying to change people, they will be better able to love you back.

At work, you are exceptionally goal-oriented and have a clear idea of the objective at hand. If things take too long, you become impatient. You have a steady need to complete something. Your first thought is, "Why isn't this finished already?" When your sense of urgency is overwhelming, you can send destructive messages. Others can see you as a person who cares only about the bottom line and not people. You can end up doing things twice because you are sometimes in too much of a rush.

Slow down, enjoy the process of living. Before you start something new, take the time to appreciate the important things you have already accomplished. You will feel more connected to the world and less isolated. Achieving things is not the only measure of success. Recognize that learning something is reason enough to feel good about yourself.

FIG 5

GREEN

*The purest and most thoughtful minds are those that love color the most.*

— John Ruskin

You are attracted to someone who is intellectually inspiring. Intelligence is a real turn-on. It entices your curiosity. Even when there's absolutely no physical attraction, you are still able to maintain a friendship. Sometimes this can be confusing to the other person, because your initial attraction can be misinterpreted.

You marry or commit for security. This might mean having a home with children, having lots of money, being cared about, or just having a stabilizing personality in your life. Sometimes the physical or mental characteristics of the person you marry are sufficient to give you this sense of security. Whatever form it takes, the need for security is the key factor in your decision making.

Your Thoughts

You're the perfect person with whom to discuss problems. Others see your concerns as encouragement to talk about their lives. They feel you can see beyond outward appearances and really understand who they are. Like fertile soil, you nurture people so that their dreams can grow.

You are initially open to the world. In fact, you probably liked most of the colors in The Dewey Color System™! You appear innocent, but your curiosity makes you quite knowledgeable. You know about life, either through your own activities or through listening to others.

Your Natural Talents

You are practical and reliable. Everyone appreciates how supportive you are and how you establish a nurturing environment. You're a natural at managing your talents. In fact, you are excellent at managing materials and financial resources.

These qualities allow you to do well with the public. It gives you the ability to do well in professions that include interviewing, training, counseling, or working with children. You need to work for a company that will be consistent in its employment policies. This will allow you to feel secure about your future.

As you mature, seeking a stable career position will increase in importance. If your practical affairs aren't in order, you cannot be at peace. You need to be disciplined and work hard if you are to acquire material possessions. Some careers that will enhance your passions are banking, investing, insurance, business management, medicine, or consulting.

What Turns You On and Off

You understand people's true intentions. When talking with someone you've just met, or with friends and lovers, you initially put their needs before your own. This allows you to walk in their shoes and see how they feel inside. Then, you step back to objectively view their intentions. You see others for who they really are.

Key Words: Nurturing, Concerned, and Being Comfortable

Power: The ability to create supportive environments

Motivation: To understand who you are and what you want

Your Life's a Party When

...you know how others feel, and if they support and care about you. When people need you, you are there for them. You are good at listening to a person's problems and giving solid advice. Your concern for their well being makes them feel more secure.

Your Hang Ups Occur When

...you question your Identity. You can feel as if you are too close to someone and blame him or her for this dependence. You begin to withdraw and become consumed with yourself instead of being the supportive person that you normally are. This can shock or upset those who count on you. The more confident you are, the less this occurs.

Be a Star

Accept your sensitivity as a great gift, not a weakness. It will give you the strength to better support yourself and those around you. Cherish it and you will grow.

FIG 6

GREEN least favorite

You Seek To Be Nurtured

You seek to be nurtured by providing for others. You need to believe that your concern for them will make them loyal to you. You will even sacrifice your own happiness. When you feel good, you remember to take care of yourself. When you are down, you have a tendency to avoid your supportive personal routine completely.

Your independent nature allows you to work for long periods of time without asking for help. You feel like an explorer. You go to extremes to make sure that co-workers and customers are happy. You are concerned for them, as if they were your children. You can in fact become so busy saving others that you lose yourself. Don't try to fix things until you've heard everything.

When you're upset, you become frustrated and emotionally spent and hit rock bottom. Only then do you realize what you need and tell others exactly what you want. It is as if you expect people to intuitively understand your needs. Like a child, you are hoping someone will care enough to notice. When you were growing up, did you believe you had to take on the responsibilities of an adult? Did you have to give support to your brothers or sisters or be there for one of your parents? Now, when you ask for help do you feel it signifies that you are weak and powerless?

Ask yourself every morning when you first get up, "What do I really need today, and who will support me after I tell them what I want?" Then listen to your feelings. Don't deny what you really want because of your concern for others. Selfishness for you would be a virtue. Everyone around you will be happier when you tell them what you want. The quicker you proclaim it, the better your relationships and life will become.

FIG 7

YELLOW and GREEN

The Caretakers

Your realistic perspective creates comfortable and secure environments for yourself and those around you. You listen to what others say and see their point of view. By questioning what others really need instead of accepting what they think they need, you help them learn.

Taking care of other people is your purpose and natural talent. However, when you're overprotective, you're not doing anyone any favors. Don't interfere with others' ability to discover their own needs. Constantly rescuing people denies them the opportunity to confront their own responsibilities. So step back and allow them to be themselves without your support. If they should fail, that's okay. Only then will they be able to distinguish what they ought to be doing.

Since you sympathize with the perspective of the people in your life, it can be difficult for you to be objective about yourself. Try to forget about your surroundings and focus on your own needs. This will enable others to give you better support and keep you from neglecting your own happiness.

If you like yellow more than green, you are more realistic about your own personal growth and career advancement than you are about your relationships.

If you like green more than yellow, you tend to be more realistic about your relationships and less directive about achieving your goals.

FIG 8

BLACK

*We function on feeling. When you know the magic, you will always find a place in the Kingdom.*

— Walt Disney

Your Hopes

You know the value each person brings to a relationship. Others see you as an impetuous, forceful, self-protective person. You want to know about the unknown. You try to map your life into a logical plan about the future. At decision time, your feelings can override rationality.

Your commitment to others provides you with a healthy perspective of yourself. You passionately extend yourself to others. When you get too close and they reject you, your feelings play back an emotional review of your life. Contemplating past emotional feelings makes you feel secure and gives you the sense that you are on the right path.

Your Fears

You take people and events too seriously. This makes it hard, sometimes impossible, for you to remain objective. You tend to shift the blame on someone or something else if things don't go your way. Much of your misery is caused by not letting go of the past. Retreating into your memories only compounds your problems.

When you become upset, you exaggerate your responsibilities and feel overwhelmed. Only when you're emotionally exhausted do you consider making changes. Starting a new course of action makes you feel guilty, as if you're betraying others or losing yourself.

Feed Your Soul

You find it sexy when others need you. It allows you to feel close to them, even safe. Being close to others makes you feel that the world cannot hurt you. When others encourage you to express how you feel, it turns you on.

You feel very responsible for those around you. This makes those you care about feel comfortable. They know where you stand. It can also, however, make you too predictable. If you don't already, make it a point to blow it out occasionally. Keep it spicy!

"Unstuff" Your Relationships

When you feel that others aren't giving you emotional support, you try to get even closer. Take a step back and give them the space they need. Don't let your need to be emotionally attached push them away. If you feel pain, it is all about your denial to accept something that is occurring. Don't be so needy. Your defensiveness will negatively affect your self-confidence and make it difficult to be close to you.

Getting It Done

You're disciplined and keep others in line. When you are loyal or have ownership, you fight to keep what is yours. You're an overachiever and need autonomy to be at your best. You like to get things finished without being interrupted. Still, you need for co-workers to be loyal to you and, in turn, you are genuinely concerned about them.

Get Your Act Together

Your need to complete everything can hamper your ability to be open to essential information. This stubborn streak will be your downfall. Don't let your determination make you miss the obvious. Listen for new options, even after your decision is made. Let others contribute. Many times, new ways of doing things will actually complement your way.

Your Great Lesson

Your memories are the treasures of your spirit. They belong only to you. Honor them by not getting tangled up in your emotions. Learn from them and move forward.

Key Words: Emotional, Focused, and Loyal
Power: To know your emotions
Motivation: To understand your past

FIG 9

BLACK least favorite

You Make Unemotional Decisions

You want to be more rational. At decision time, you are unemotional. This detachment helps you connect new ideas and information. Using only logic, you can see where others are excessive and inconsistent. You cut to the truth to focus on what needs to be done.

In your relationships, you become very attached and your emotions overwhelm you. Completely losing yourself can be a major turn-on. Later, however, you can experience an empty feeling, as if you have lost yourself. Ending a relationship at first appears to be easy for you, but releasing the emotions is difficult. You must understand that still having feelings after the fact doesn't mean you should go back and change your decision.

In the workplace, you are driven and desire advancement. You expect others to recognize your levelheaded way of doing business. You wish to make your own schedule without having to report to a superior. Under pressure, you become very logical. This is the exact opposite of what happens in your relationships. When the pressure is really tough, co-workers seek you out for an unbiased perspective. Helping them solve their problems makes you feel special.

Get in touch with your emotions. Try not to be so logical all the time. If you follow your heart instead of your head, you will be happier in the long run. You'll better understand the value of your commitments and any changes occurring in your life will better fit your needs. You will gain the power to understand and better direct those "illogical feelings."

FIG 10

YELLOW, GREEN and BLACK

The Truth Seekers

Discover Yourself
You are constantly re-examining yourself to identify what is important. Being truthful is your purpose in life. You need veracity to be aware of yourself. You will speak the truth even when others do not want to listen. When you first meet someone, they have no idea that this is who you are. After listening to them, you can't help but be open and honest. You stun them with your obvious truths.

Dive In
If you make up your mind about something, there is nothing that can stop you from achieving your goals. You are able to remain focused and resourceful at the same time. By maintaining a keen awareness, you know what is working. This is your great talent. Concentrate on building a trusting rapport with others instead of dwelling on how you are different. Others will feel secure with the advice that you give them and you will be able to recognize your own emotional patterns in the future.

But Beware
When people are unwilling to listen, they may reject your ideas or avoid you. Don't feel that you're misunderstood or that you're an outcast. Others are just trying to protect themselves. Accept that you are someone who must tell the truth and that many times others are not strong enough to confront the realities you reveal.

Relationship Tips
Your intense, high-energy personality is somewhat hidden in a crowd. Strangers will see you as honest and open. You need a cause and you usually find it in being there for someone.

If you choose blue as your least favorite primary, you are dedicated to giving support to the people in your life who really need you. You are a great friend. Your objective opinions are remarkably accurate. In fact, they can shock those around you so forcefully that they fail to see how much you care. Before you express yourself, tell others, "I have a thought that might help." They will then be better able to understand the way you show love.

If you choose red as your least favorite primary, you are seeking to be respected. At first you hide who you are, then suddenly reveal yourself to others as a strong, opinionated person they had no idea existed. You are a character! Even though your truthful, well thought out statements need to be uttered, you become overly sensitive when others frown at your remarks. Direct your truths at those who are really available to listen. Their positive response will give you the respect that you deserve.

Work Tips
You need to be respected as an authority at whatever you do. Use your directness to educate people on how to perform their jobs better and to increase productivity. When others realize you have their best interests at heart, they will respect your talents. You're at your best when you are constantly securing new and better worlds for those around you. Jobs such as residential architect, real estate broker, doctor, nurse, or counselor will make you feel more complete.

Things Will Be Just Fine If
prior to giving advice, you consider whether the other person is in the frame of mind to listen. If not, stop talking. Make a mental note and try having the conversation at another time, using a less emotional way of making your point. Eventually, you will be heard and the truth will come out.

FIG 11

TEAL

*Tact is the intelligence of the heart.*

— Anonymous

What's on Your Mind
You seek to develop your self-esteem. Use your excellent communication skills and ability to empathize with other people's points of view. A great diplomat, you build people up by actively listening and giving them positive feedback. You want to help others become everything they want to be. This makes you feel important and helps you fit in.

Your Highs
Sometimes you get up in the morning and feel like the most important person in the world. You feel you have the capabilities to accomplish whatever you want. You see your dreams within your grasp. Your past achievements become personal victories that make you proud.

| | |
|---|---|
| Key Words: | Social worth, Empathy |
| Initiates: | Respect to accomplishments |
| Concerns: | Do others think well of me? |

And Lows
Sometimes you feel as if you are not important at all, that you are pleasing others, not yourself. This can make it difficult for you to be creative. Stop being so concerned with what others think. Be honest with yourself. Muster the courage to speak up even when others do not want to listen. You will gain trust and respect from your peers. They will see you as more authentic.

The Seductive You
You are very endearing. Sensitivity to other people's needs helps you to start new relationships. You try to become what the other person is looking for. You boost the confidence of people. This makes you very attractive.

Yet, your concerns about what others think can keep you from being completely honest. In your desire to be accepted, you sometimes say what people want to hear, instead of how you feel. Later on, they're in for a shock when your actions don't reflect your words. Being forthcoming about your own needs will go a long way toward making others feel comfortable.

Your Healing Force
Your belief in others' dreams makes them believe in themselves.

FIG 12

TEAL least favorite

You Are Skeptical

You work very, very hard because you have a deep need to show you are competent. You may tell yourself that you don't care about what others think, but this is just a defensive ploy.

When you voice your skepticism, that's when you get into trouble and you later regret what you said. Even though you might have been right, was there anything gained by saying something hurtful?

Everyone knows where they stand with you. Many times this makes those close to you feel more comfortable. Others might hear, sometimes for the first time, how they are perceived. Your outspoken nature can make it difficult to get close to you. Give the other person the opportunity to say what they really believe to be true, before you even think about your opinion.

Encourage others to seek their dream even when you don't believe in it. Remember, their dreams are about them, not you. Appreciate their positive energy. You'll become more optimistic about your own wishes.

FIG 13

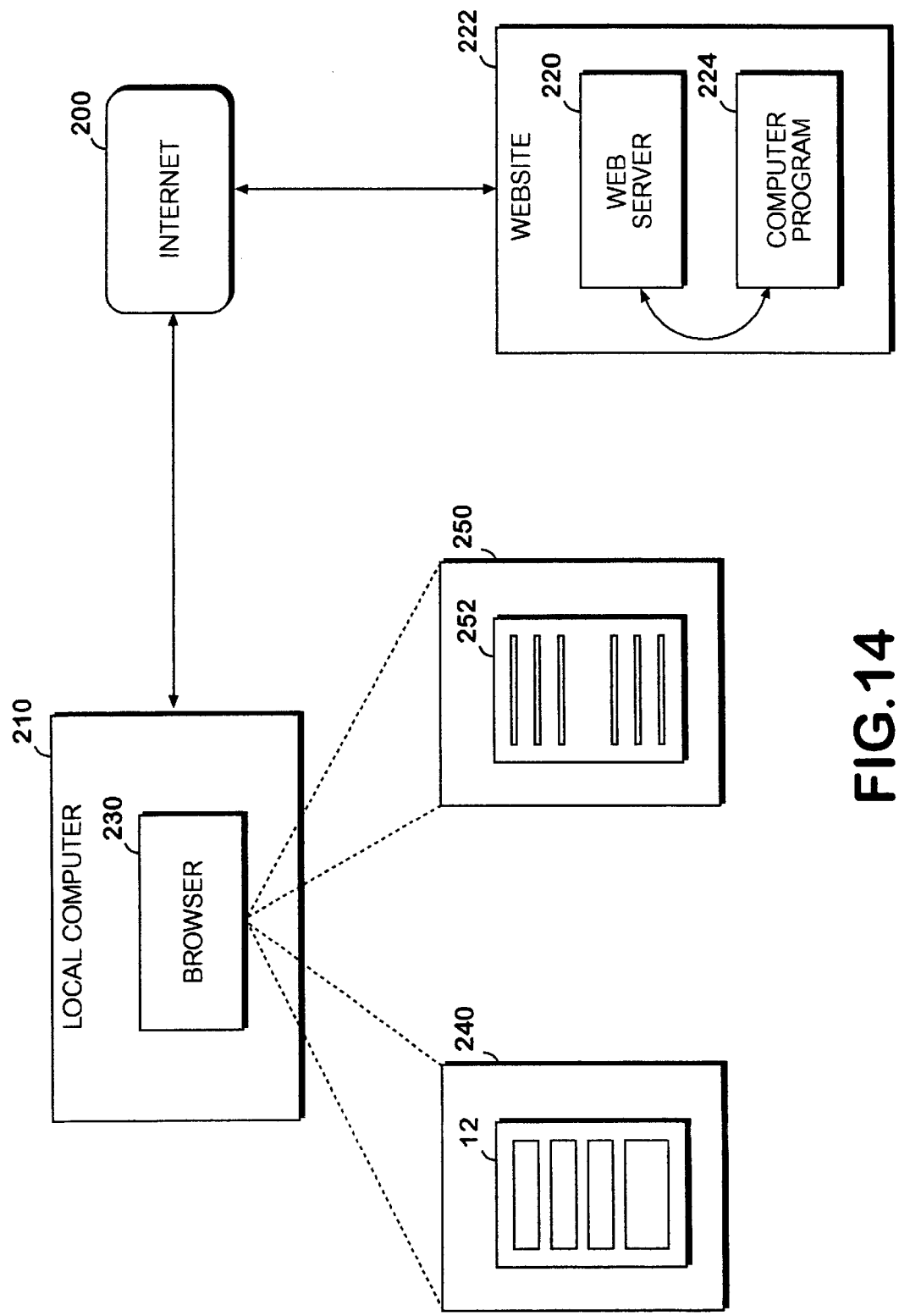

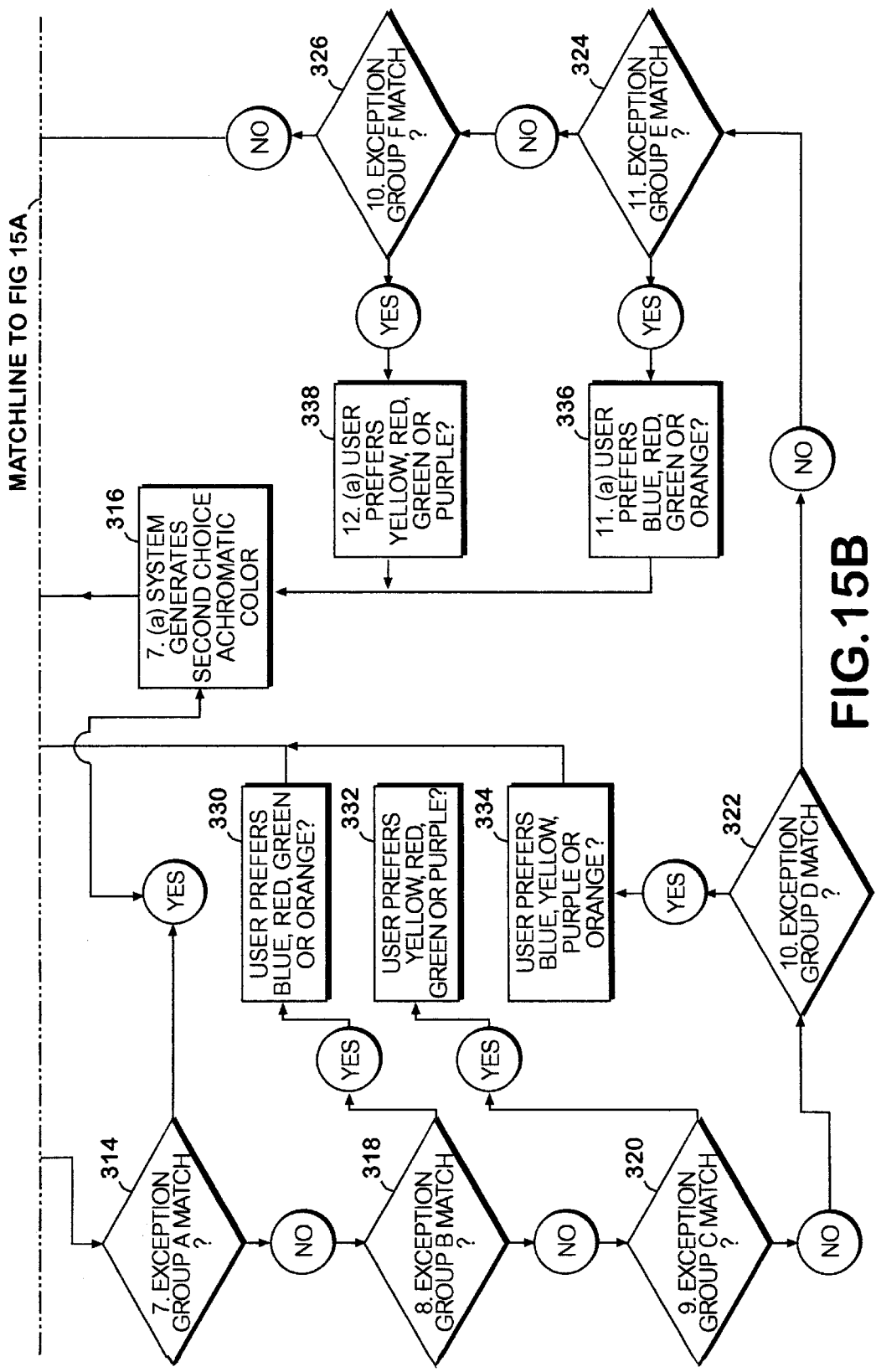

COLOR PREFERENCE SELF-HELP SYSTEM

RELATED APPLICATION

The following patent application Ser. No. 09/637,545 for related subject matter, "COLOR HARMONIZING DEVICE AND METHOD FOR USING THE SAME", incorporated herein by reference, has been filed concurrently with the present application by the inventor of the present application.

TECHNICAL FIELD

The present invention relates to self-help guides and, more particularly, relates to understanding patterns of human behavior based upon color preferences.

BACKGROUND OF THE INVENTION

There is a myriad of self-help guides available. Typically, these known self-help guides merely explain how a person perceives his own behavior. Most of these self-help guides use a language based system, which can produce erroneous results for identifying and analyzing the reader's own personality.

In instances where self-help guides provide personality analyzers the user is aware that his or her choices will influence the ultimate results that indicate their type of personality. Consequently, current self-help guides force users to make choices of which he or she may be unsure because he or she realizes that his choices may change or are different during different times or moods.

Accordingly, there is a need for a validated and consistent system and method for determining and understanding human behavior. The reliability of such a system and method must accurately measure a user's choices under the system and permit the user to select his or her choices in a confident manner.

SUMMARY OF THE INVENTION

The present invention solves the above-identified problems by providing a color preference-based self-help system. The color preference system of The present invention identifies human behavior based on the colors that an individual selects from a group of colors. Because individuals are typically already aware of their most favorite and least favorite colors, and one's favorite and least favorite colors typically remain the same over an extended period of time, the use of color as a human behavior indicator eliminates indecision and assures one's confidence in the results of the system.

Generally described, the present invention includes a plurality of colors which include a primary set of colors, a secondary set of colors, an achromatic set of colors, and an intermediate set of colors. A set of indicia is associated with each of the colors. Each set of indicia identifies at least one distinctive human behavior. One's favorite and least favorite colors from each set are selected and used by the system to identify a predicted pattern of human behavior.

The foregoing broadly outlines some of the more pertinent aspects and features of the present invention. These aspects and features, however, should only be construed to be merely illustrative of some of the more prominent features and applications of the invention. One can obtain other beneficial results by applying the disclosed information in a different manner or by modifying the disclosed embodiments. Accordingly, in addition to the scope of the invention defined by the claims, one can obtain other aspects and a more comprehensive understanding of the invention by referring to the detailed description of the exemplary embodiments taken in conjunction with the accompanying drawings.

BRIEF DESCRIPTION OF THE DRAWINGS

FIG. 4 illustrates an exemplary embodiment of the indicia describing a predicted human behavior associated with a favorite color from the primary set.

FIG. 5 illustrates an exemplary embodiment of the indicia describing a predicted human behavior associated with a least favorite color from the primary set.

FIG. 6 illustrates an exemplary embodiment of the indicia describing a predicted human behavior associated with a favorite color from the secondary set.

FIG. 7 illustrates an exemplary embodiment of the indicia describing a predicted human behavior associated with a least favorite color from the secondary set.

FIG. 8 illustrates an exemplary embodiment of the indicia describing a predicted human behavior associated with a combination of favorite colors from the primary and secondary sets.

FIG. 9 illustrates an exemplary embodiment of the indicia describing a predicted human behavior associated with a favorite color from the achromatic set of colors.

FIG. 10 illustrates an exemplary embodiment of the indicia describing a predicted human behavior associated with a least favorite color from the achromatic set of colors.

FIG. 11 illustrates an exemplary embodiment of the indicia describing a predicted human behavior associated with a combination of favorite colors from the primary, secondary and achromatic sets.

FIG. 12 illustrates an exemplary embodiment of the indicia describing a predicted human behavior associated with a favorite color from the intermediate set.

FIG. 13 illustrates an exemplary embodiment of the indicia describing a predicted human behavior associated with a least favorite color from the intermediate set.

FIG. 14 illustrates an exemplary embodiment of the present invention operating within the environment of the Internet on a web site.

FIGS. 15A and 15B illustrate an exemplary embodiment of a flowchart for implementing the present invention on the web site.

Similar reference characters refer to similar parts throughout the several views of the drawings.

DETAILED DESCRIPTION

The present invention permits the identification and understanding of one's personality based upon the selection of their most favorite and least favorite colors from a predetermined set of colors. Although the present invention may be utilized in a variety of applications, the operation of the present invention will be demonstrated by describing specific embodiments. One embodiment of the present invention is a book. Other exemplary embodiments of the present invention can exist on a computer-readable medium for use on a computer or on a web page for use on the Internet.

Figure 1:
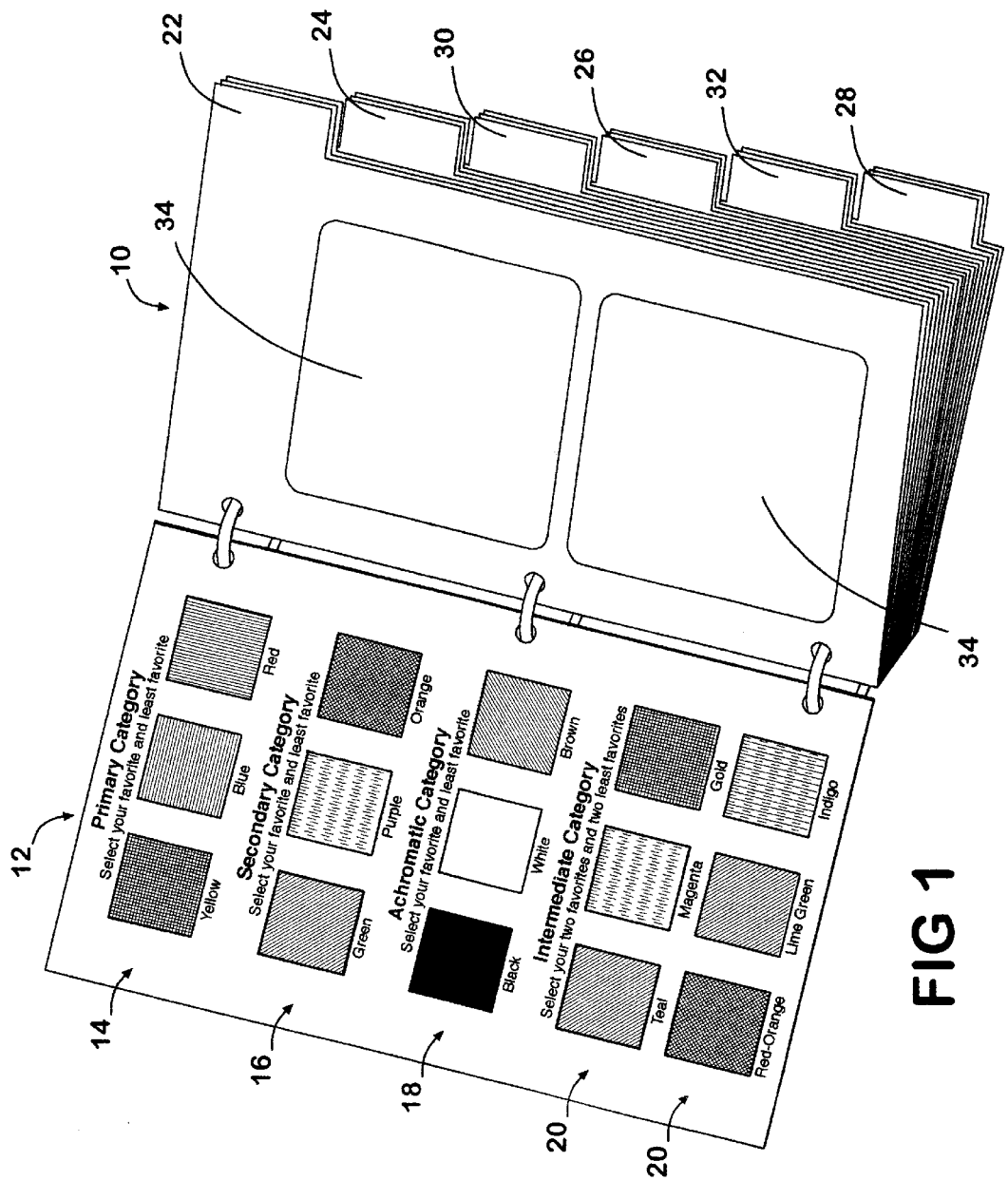
FIG. 1 illustrates an exemplary embodiment of a book embodying the present invention.

With reference to the drawings, a book for providing self-help embodying the principles and concepts of the present invention and generally designated by the reference number 10 will be described. As shown in FIG. 1, the book 10 includes a chart 12 depicting a plurality of color representations. Those skilled in the art understand that slight variations in color often exist from time to time. Often these variations in color result in the printing or fabrication of the color. However, as a result of these variations in color, the colors identified in the present invention are not exact and may be varied slightly. Therefore, colors are commonly referred to as color representations to indicate some variation in the color is permissible in the present invention.

Figure 2:
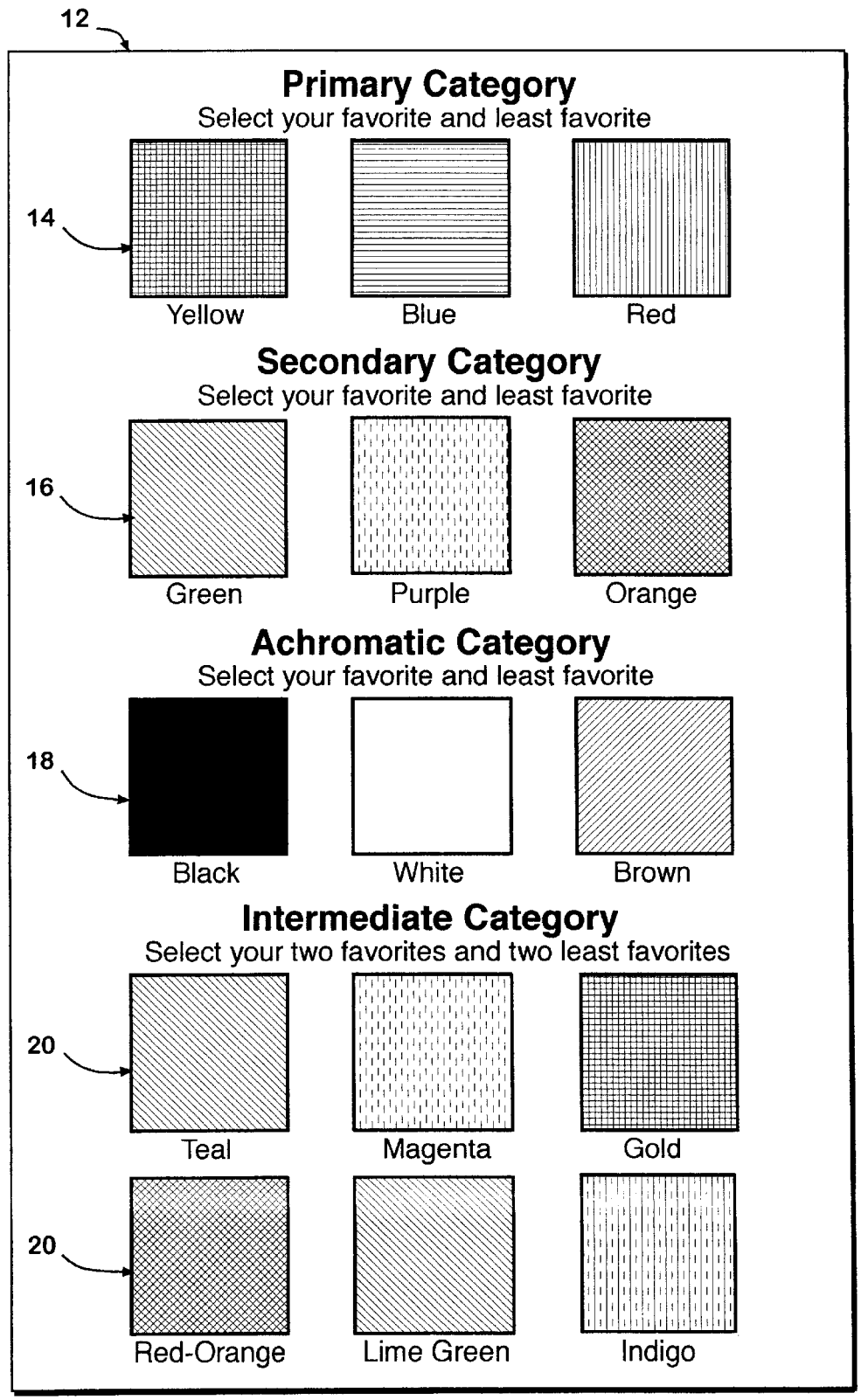
FIG. 2 an exemplary embodiment of a plurality of color representations of the present invention categorized into separate categories of color representations.

FIG. 2 illustrates the chart 12. The chart 12 includes a primary set 14, a secondary set 16, an achromatic set 18, and an intermediate set 20 of color representations. The primary set of colors 14 are known to be yellow, blue and red. The secondary set of colors 16 are determined by combining two primary colors to achieve the colors green, purple and orange. The achromatic set of colors 18 are black, white and brown and are selected because they provide variations in hue for the primary and secondary colors 14, 16. Finally, the intermediate set of colors 20 are teal, magenta, gold, red-orange, lime green, and indigo. The intermediate colors 20 are derived from combining a primary color with a secondary color. For example, blue and green combine to make teal.

The inventor has discovered that one's preference for a particular color from this group of colors is useful in predicting human behavior. In other words, your most favorite and least favorite colors indicate your personality. Also, because your preference for particular colors remains relatively consistent over a period of time, the predicted human behavior is more accurate. As a result of using the present invention, one obtains a stronger awareness of oneself with an increased ability to describe how one's life is lived.

As best shown in FIG. 1, the book 10 also includes a plurality of pages describing the predicted human behaviors. The predicted human behaviors are identified by indicia contained on each of the pages. In the exemplary embodiment shown in FIG. 1, the pages of indicia representing the predicted human behaviors associated with the primary colors are indicated by the reference numeral 22, the pages of indicia representing the predicted human behavior of the secondary colors are indicated by reference numeral 24, the pages of indicia representing the predicted human behaviors of the achromatic colors are indicated by reference numeral 26, and the pages of indicia representing the predicted human behaviors of the intermediate colors are indicated by the reference numeral 28.

Preferably, the indicia representing the predicted human behaviors associated with any of the colors of the chart 12 when selected as a least favorite are preferably indicated on pages immediately following the pages containing the human behaviors when the same color is instead selected as the most favorite. Some of the pages may include areas of grouped text, such as those identified by reference numeral 34, to describe aspects of an identified human behavior, as shown in greater detail below.

Independent survey results indicate the primary colors are basic motivators or your power sources because they are the strongest hues. In other words, the primary colors indicate in the broadest sense who you are. For example, the color yellow indicates Giving, blue indicates Vision, and red indicates Directness.

The secondary colors determine how you reason in your relationships. Green is Nurturing in that one has the ability to create supportive environments, purple is Determined for being able to see new possibilities and ideas, and orange is Boldness for being able to implement change without disruption.

Black, brown and white are in the achromatic set because that are not in the chromatic spectrum. The achromatic colors represent your inner self and are the underlying force behind all your hopes and fears. Black is for Focus and knowing your emotions, brown is for Awareness in understanding reality, and white is for Objectiveness and the ability to see new options.

Combining a primary color with a secondary color will help to determine who you are and what you want. The nine primary/secondary color combinations with their associated personality traits are listed below and the pages of indicia representing the predicted human behaviors associated with these nine combinations of colors are indicated by the reference numeral 30.

| Color Combinations | Personality Traits |
| --- | --- |
| Yellow and Green | Caretaker-creates comfortable and secure environments |
| Yellow and purple | Catalyst-inner fire for change |
| Yellow and orange | Technical thinker-maximizes resources with a systematic approach |
| Blue and green | Anchor-nurtures and supports others |
| Blue and purple | Thinker-needs to know why things are |
| Blue and orange | Builder-demands an exciting life |
| Red and green | Resource manager-teaches others how to achieve more |
| Red and purple | Synthesizer-integrates facts with emotions |
| Red and orange | Humanitarian-honors individuality |

There are a possible twenty-seven color combinations of the primary, secondary and achromatic sets of colors. The personality characteristic associated with each particular color of a combination of colors are combined with one another. This combination of personality traits is then subject to interpretation and a predicted human behavior is developed. The pages of indicia representing the predicted human behaviors associated with these twenty-seven color combinations are indicated by the reference numeral 32.

The six colors in the intermediate set of colors indicate how you approach the world with what you need to direct your life. In other words, the intermediate set of colors show how you make requests of others. The six intermediate colors and their associated personality traits are listed below.

| Intermediate Color | Personality Traits |
| --- | --- |
| Teal | Empathy, respect for accomplishments |
| Magenta | Enthusiastic, attracts new people and situations |
| Gold | Resourceful, eliminate undesirable thoughts |
| Red-orange | Self respect, respect for others |

-continued

| Intermediate Color | Personality Traits |
| --- | --- |
| Lime green | Logical, does things in a rational way |
| Indigo | Self-confident, constructive thinker |

Figure 3:
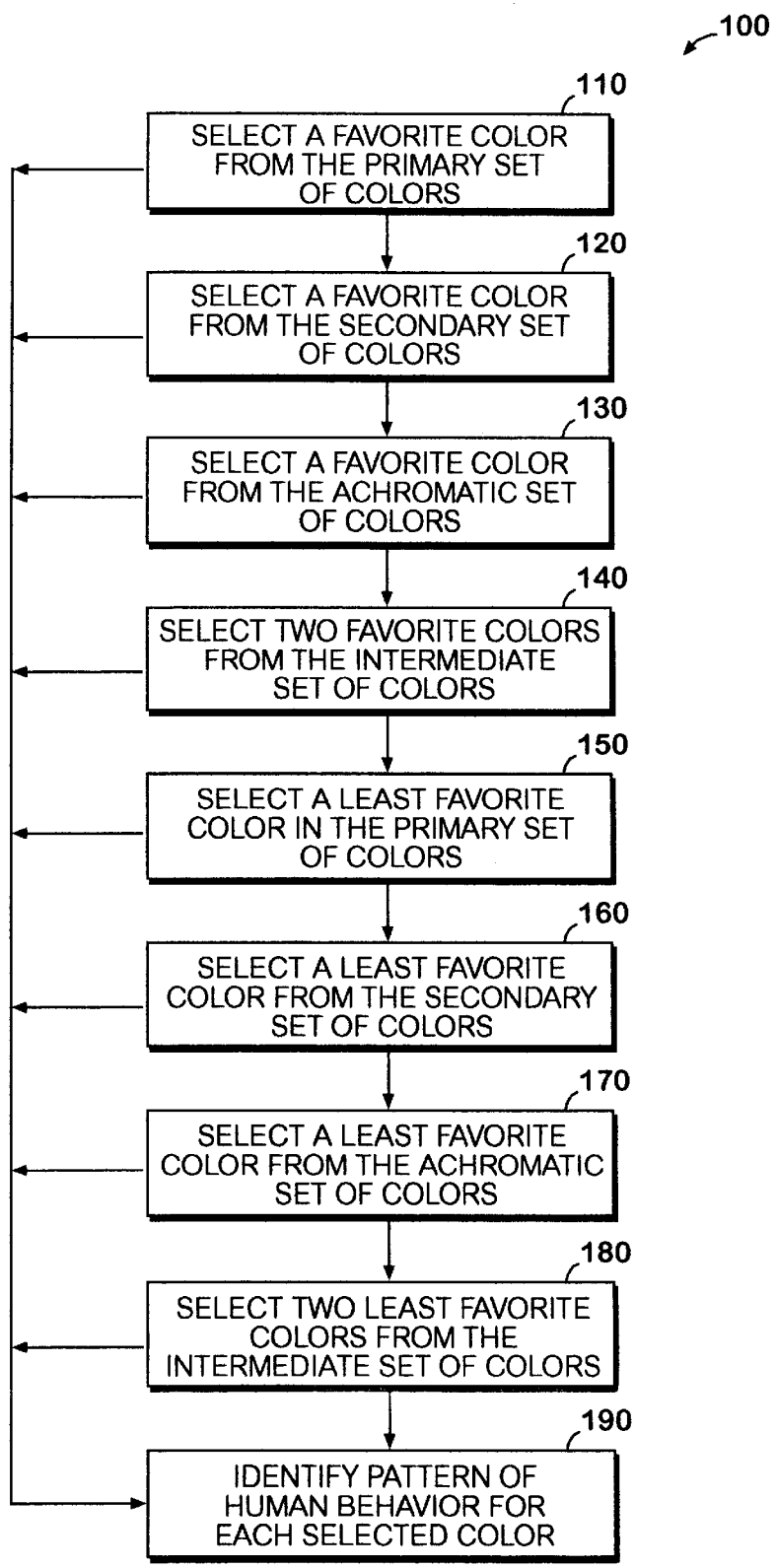
FIG. 3 illustrates an exemplary embodiment of a flowchart of the present invention.

FIG. 3 illustrates an exemplary embodiment of a flowchart of a method 100 of using the present invention. The use of the system of the present invention constitutes an inventive method of the present invention in addition to the book 10 itself. In practicing the method 100 of identifying patterns of human behavior, the steps include providing a plurality of color representations which include the primary set of color representations 14, a secondary set of color representations 16, an achromatic set of color representations 18, and an intermediate set of color representations 20. The method 100 then includes the step of associating a predicted human behavior with each color of the plurality of color representations. The method 100 also includes the step of selecting a favorite from the primary set of color representations, the secondary set of color representations, and the achromatic set of color representations. The invention then includes the step of selecting two favorites from the intermediate set of color representations.

The method 100 also includes the steps of selecting a least favorite from the primary set of color representations, the secondary set of color representations, and the achromatic set of color representations, and then selecting two least favorites from the intermediate set of color representations. Next, the method 100 includes identifying the predicted human behaviors associated with each of favorite and least favorite color representations selected from the plurality of color representations. The method 100 could also include the step of subjecting to interpretation the selection of the favorite and least favorite color representations to interpretation.

In accordance with the exemplary embodiment of the present invention as shown in book 10, to practice the present invention, a user selects his favorite color from the primary set of colors 14 and may read about the predicted human behavior associated with the selected color by locating the page or pages in the book 10 which identify the associated human behavior. For example, FIG. 4 depicts the predicted human behaviors associated with selecting Yellow as one's favorite color from the primary set of colors. The predicted human behavior is preferably indicated by text, but may alternatively be depicted by caricatures or other illustrations. FIG. 4 includes various areas of grouped text to describe multiple features of the predicted human behavior. Preferably, a quote from a famous person is also associated with the selected color as well as key words. A description of motivations and empowering ideas may also be associated with the color. A description of cautionary and opportunistic ideas may be associated with the color as well. A subsequent page or portion of the book 10 should include the predicted human behavior associated with Yellow when Yellow is instead selected as the least favorite color in the primary set of colors as shown in FIG. 5.

FIG. 6 illustrates the predicted human behavior associated with the color representation of Green when selected as a favorite color from the secondary set of colors. FIG. 7, on the other hand, illustrates the predicted human behavior associated with Green when selected as the least favorite. Also, FIG. 8 illustrates the predicted human behavior associated with selecting the combination of Yellow and Green as favorite colors. FIGS. 9 and 10 illustrate the predicted human behavior associated with selecting Black as one's favorite and least favorite color from the achromatic set of colors, respectively.

FIG. 11 illustrates the predicted human behavior associated with selecting the combination of Yellow, Green and Black as favorite colors. Also, FIG. 12 illustrates the predicted human behavior associated with selecting the color teal as a favorite color from the intermediate set of colors and FIG. 13 illustrates the predicted human behavior associated with selecting Teal as the least favorite color from the intermediate set of colors.

As described above, FIGS. 4–13 are exemplary embodiments for associating predicted human behavior with a particular color or a combination of colors selected from chart 12. Although FIGS. 4–13 depict the human behaviors associated with only a limited number of colors from the chart 12, the present invention also provides the predicted human behaviors associated with the remaining colors.

In another exemplary embodiment, the present invention may be conveniently implemented in one or more program modules as well as hardware components. The method 100 may be stored on a computer-readable medium. On the computer-readable medium is stored one or more program modules of a computer program for identifying patterns of human behavior. The computer program includes instructions which, when executed by a computer, perform the steps of method 100 as described above.

The present invention may conveniently be implemented in a program language such as "C"; however, no particular programming language has been indicated for carrying out the various tasks described because it is considered that the operation, steps, and procedures described in the specification and illustrated in the accompanying drawings are sufficiently disclosed to permit one of ordinary skill in the art to practice the instant invention. Moreover, in view of the many different types of computers, computer platforms and program modules that can be used to practice the present invention, it is not practical to provide a representative example of a computer program that would be applicable to this system. Each user of a particular platform would be aware of the language and tools which are more useful for that user's needs and purposes to implement the instant invention.

In one exemplary embodiment, the present invention includes a computer generally consisting of a processing unit which interfaces to a memory storage device, a display device and a user input device. An interface device may support at least one access line connecting the computer to the Internet. The access line may consist of analog or digital interfaces, and supports the process of transmitting and receiving analog or digital data in real-time or otherwise.

The memory storage device is operative to store a program module for implementing the present invention. For example, the present invention implemented as a computer program running on the computer, provides an interface to a user via the display device. The processing unit is responsive to instructions of the program module. In general, the program module can also transport data over the access line into the interface device. Periodic updates are used to provide current information and to maintain system integrity. Update frequency is determined based on system demands.

The method of the present invention may also be implemented as a web-based application as shown in FIG. 14. In this exemplary embodiment, the present invention may be maintained on a network such as the World Wide Web and is invoked by accessing the Internet 200 using a local computer 210 and an existing Internet Service Provider to contact a server 220 or series of servers for accessing a web site 222. The server 220 initiates a computer program 224 to conduct processing steps. The local computer 210 and the server 220 communicate via the Internet's File Transfer Protocol, commonly referred to as FTP. Alternatively, other technologies such as the HTTP protocol of the Web can be used for uploading and downloading files. The server 220 locates and sends the information for practicing the present invention to a web browser 230, which displays web pages having the requested information on the local computer. As shown in FIG. 14, web page 240 includes chart 12, as described above, and web page 250 includes the predicted human behavior in text 252 associated with the selected color or combination of colors displayed on web page 240. To view the files of the present invention, the user may utilize a helper application or a plug-in. The user configures the web-browser to launch these helper applications or plug-ins which are then used for performing the various tasks described above.

Hyperlinks may serve to connect one document or portion of a document to another and even one web site to another. For example, one document with the color representations may be linked to another document with the corresponding, predicted human behaviors. Various organizational structures may be used to connect the selected combinations of color representations with the appropriate corresponding, predicted human behavior.

Figure 15A:
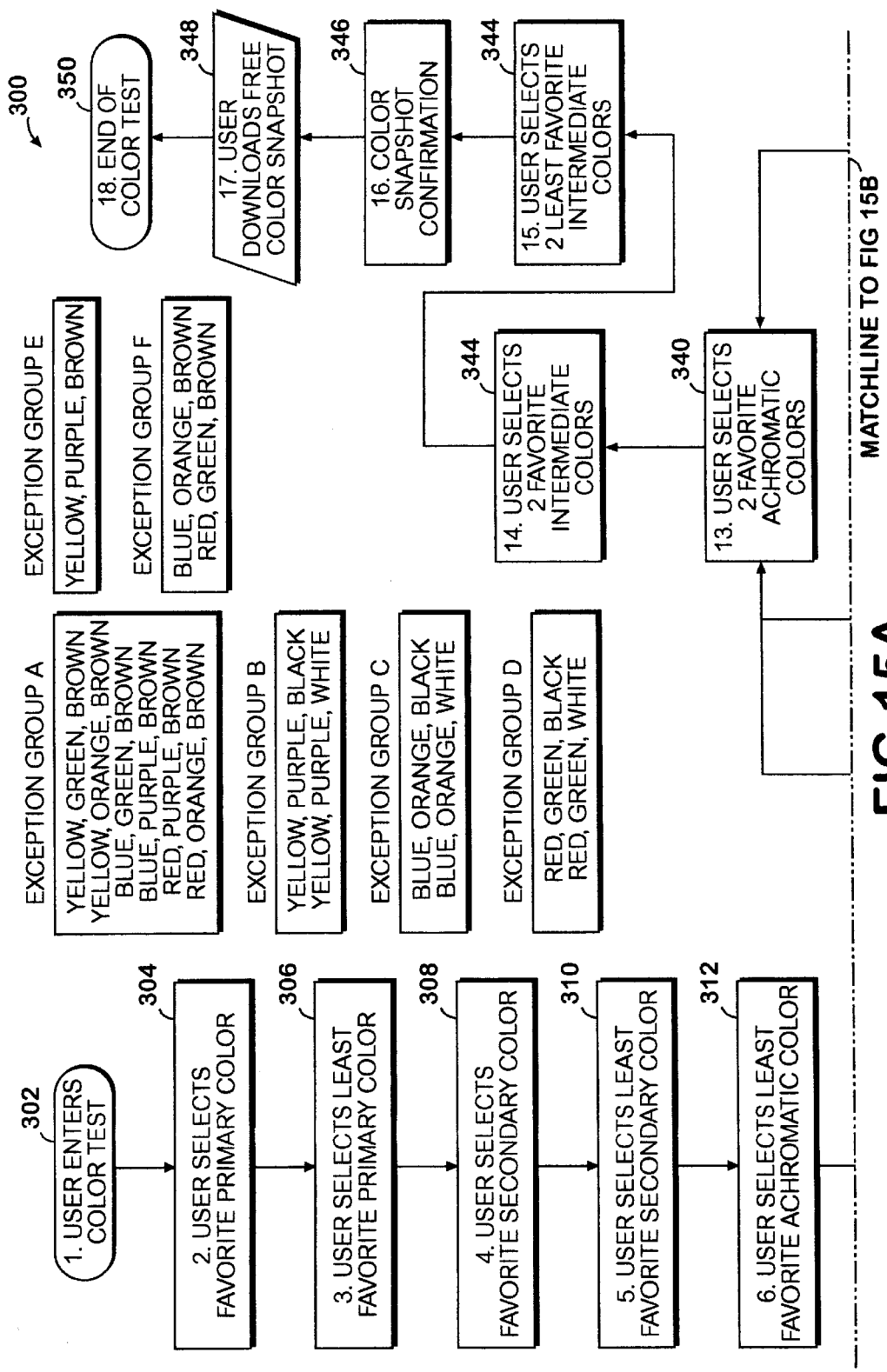

FIGS. 15A and 15B illustrate one embodiment of a flowchart 300 for implementing the present invention on the web site 222. The process shown in FIGS. 15A and 15B is implemented by the user entering the color test as shown in process block 302. The user then selects his or her favorite and least favorite primary colors as shown in process blocks 304 and 306, respectively, followed by selecting his or her favorite and least favorite secondary colors as shown in process blocks 308 and 310, respectively. Next, in block 312, the user selects his or her favorite achromatic color. In decision block 314, if the combination of colors selected is in Exception Group A, the process continues to process block 316. The Exception blocks include combinations of colors where additional information is needed for the user to receive the best analysis. For example, Exception Group A includes all the color combinations which include the color shown. Because brown was selected, an accurate description of the user may not be found. Consequently, when assessing one's relationship, the user may be required to make an additional selection between the achromatic color choices of black and white as shown in process block 316.

However, if the selected combination is not included in Exception Group A, the process continues to decision block 318. Decision block 318 queries whether a selected combination of colors is included in Exception Group B. Exception Group B includes the yellow and purple combinations which also requires the selection of an additional primary or secondary color as shown in block 330. In the event the selected color combination is not included in Exception Group B, the process continues to additional blocks inquiring whether the selected color combination is included in additional Exception Groups. Any number of Exception Groups may be used where the chosen color combination provides information which may be more precisely defined by the user choosing an additional achromatic color. However, in FIGS. 15A and 15B, following decision block 318, four additional decision blocks 320, 322, 324 and 326 are utilized which correspond with Exception Groups C through F.

Still referring to decision block 318, if the selected combination is included in Exception Group B, the process continues to process block 330 to determine whether the user prefers a particular color. Also, from decision blocks 320, 322, 324 and 326, if the selected color combination is included in the associated Exception Group, the process continues to process blocks 332, 334, 336 and 338. Similar inquiries for additional primary and secondary colors are made in blocks 332, 334, 336 and 338 as was made in block 330.

From process blocks 330, 332, 334, 336 and 338, the process continues to process block 340 where the user selects his or her least favorite achromatic color. In the event the selected combination of colors is not included in any of the Exception Groups, the process continues from the last decision block, such as decision block 326, to process block 340, described above.

From block 340, the process continues to blocks 342 and 344 where the favorite and least favorite intermediate colors are selected. Then, in block 344, a color snapshot of the user's selections is generated to confirm his or her selections and may be downloaded as shown in block 348. The snapshot includes the identified human behavior corresponding with the selected color combination. The process of flowchart 300 is terminated in block 350 to conclude the color test.

In another embodiment, users can download software from a network, such as the World Wide Web, to be installed on the local computer to practice the method 100 as described above. Internal computer networks commonly referred to as Intranets may also be used.

The present invention has been illustrated in relation to particular embodiments which are intended in all respects to be illustrative rather than restrictive. Those skilled in the art will recognize that the present invention is capable of many modifications and variations without departing from the scope of the invention. Accordingly, the scope of the present invention is described by the claims appended hereto and supported by the foregoing.

What is claimed is:

1. A system for identifying patterns of distinctive human behavior, said system comprising:

a display means for (i) displaying a plurality of color sets to a user, each of the color sets comprising a plurality of unique color representations, and (ii) prompting the user to select a favorite and a least favorite color from each of the said plurality of color sets, said plurality of color sets comprising:
   a primary set of color representations;
   a secondary set of color representations;
   an achromatic set of color representations; and
   an intermediate set of color representations;

a user input means for receiving a selection of a favorite and least favorite color for each set of said plurality of color sets from a user;

a database storing at least one indicia associated with each of said color representations of said plurality of color sets, the indicia identifying at least one predetermined distinctive human behavior;

a processor for retrieving indicia from the database associated with the selection of the favorite and least favorite color; and said display means for displaying said associated indicia.

2. The system of claim 1 wherein said indicia is text delivered via electronic media.

3. The system of claim 1 wherein said at least one predetermined distinctive human behavior patterns are based on evaluation data.

4. The system of claim 1 wherein each said color representation of said plurality of color representations is associated with a first said human behavior when selected as said favorite color representation and a second said human behavior when selected as said least favorite color representation.

5. The system of claim 1 wherein said system is operative to permit selection of one of said favorite and said least favorite of said primary set of color representations, selection of one of said favorite and said least favorite of said secondary set of color representations, selection of one of said favorite and said least favorite of said achromatic set of color representations, and selection of two of said favorite and two of said least favorite of said intermediate set of color representations.

6. The system of claim 1 wherein said primary set of color representations are yellow, blue and red representations.

7. The system of claim 1 wherein said secondary set of color representations are green, purple and orange representations.

8. The system of claim 1 wherein said achromatic set of color representations are black, white and brown.

9. The system of claim 1 wherein said intermediate set of color representations are teal, magenta, gold, red-orange, lime green and indigo representations.

10. A method for identifying patterns of human behavior, said method comprising the steps of:
  displaying to a user a plurality of color representations comprising:
    a primary set of color representations;
    a secondary set of color representations;
    an achromatic set of color representations; and
    an intermediate set of color representations;
  storing indicia of a distinctive human behavior with each said color of said plurality of color representations in a database;
  receiving a user's selection of a favorite from said primary set of color representations, said secondary set of color representations, and said achromatic set of color representations;
  receiving a user's selection of two favorites from said intermediate set of color representations;
  receiving a user's selection of a least favorite from said primary set of color representations, said secondary set of color representations, and said achromatic set of color representations;
  receiving a user's selection of two least favorites from said intermediate set of color representations; and
  retrieving indicia of said distinctive human behaviors associated with said favorite and least favorite color representations selected from said plurality of color representations from said database; and
  displaying said indicia associated with said distinctive human behavior.

11. The method of claim 10 further comprising the step of subjecting to interpretation the selections of said favorite and least favorite color representations.

12. A computer-readable medium on which is stored a computer program for identifying patterns of human behavior, said computer program comprising instructions which, when executed by a computer, perform the steps of:
  providing a plurality of color representations comprising:
    a primary set of color representations;
    a secondary set of color representations;
    an achromatic set of color representations; and
    an intermediate set of color representations;
  associating a distinctive human behavior with each said color of said plurality of color representations; and
  permitting a user to perform the following steps:
    selecting a favorite from said primary set of color representations, said secondary set of color representations, and said achromatic set of color representations;
    selecting two favorites from said intermediate set of color representations;
    selecting a least favorite from said primary set of color representations, said secondary set of color representations, and said achromatic set of color representations;
    selecting two least favorites from said intermediate set of color representations; and
    identifying said distinctive human behaviors associated with said favorite and least favorite color representations selected from said plurality of color representations.

13. The computer-readable medium of claim 12 wherein the pattern of human behavior is based on stored evaluation data.

14. A method enabling a user to determine a predicted human behavior from viewing a web site responsive to identification of color preferences, using a computer and a telecommunications link between the computer and the web site, the method comprising the steps of:
  providing a web page to the computer;
  in response to providing said web page, providing a plurality of color representations comprising:
    a primary set of color representations;
    a secondary set of color representations;
    an achromatic set of color representations; and
    an intermediate set of color representations;
    associating a predicted human behavior with each said color of said plurality of color representations;
  selecting a favorite from said primary set of color representations, said secondary set of color representations, and said achromatic set of color representations;
  selecting two favorites from said intermediate set of color representations;
  selecting a least favorite from said primary set of color representations, said secondary set of color representations, and said achromatic set of color representations;
  selecting two least favorites from said intermediate set of color representations; and
  identifying said predicted human behaviors associated with said favorite and least favorite color representations selected from said plurality of color representations.

15. A hypermedia document for identifying predicted patterns of human behavior comprising:
  a plurality of hyperlinks providing access to a plurality of files stored on a web site, at least one of said files including one or more of said hyperlinks to other of said files, said files depicting a plurality of color representations comprising:
    a plurality of color representations comprising:
    a primary set of color representations;
    a secondary set of color representations;
    an achromatic set of color representations; and
    an intermediate set of color representations;
    at least one indicia associated with each of said color representations of said plurality of color representations, said indicia identifying at least one predicted human behavior, wherein favorite and least favorite color representations are permitted to be selected to identify the predicted pattern of human behavior,
wherein said hypermedia document is encoded on a computer-readable medium.

16. The system of claim 1, wherein said user interface means is selected from the group consisting of a stand-alone computer program and a network based computer program, wherein said stand-alone computer program and said network based program are encoded on a computer-readable medium.

17. The system of claim 1, wherein said user input means is a computer input device adapted to provide input to said data processing system.

18. The system of claim 1, wherein said display means is selected from the group consisting of a computer monitor and an electronic display screen capable of displaying digital or analog information.

19. A data processing system for identifying patterns of distinctive human behavior through color preference, said data processing system comprising:
   an internet access means for processing data;
   a web page means for gathering color preference data and facilitating the delivery of data to said data processing system;
   a database means containing a plurality of distinctive human behavior patterns;
   a plurality of color button representations comprising:
      a primary set of color button representations, wherein said color representations are primary colors;
      a secondary set of color button representations, wherein said color representations are secondary colors;
      an achromatic set of color button representations, wherein said color representations are achromatic colors; and
      an intermediate set of color button representations, wherein said color representations are intermediate colors;
   wherein at least one indicia is associated with each of said plurality of color button representations, each said set of indicia identifying at least one of said plurality of distinctive human behavior patterns, wherein a favorite and least favorite color set is selected from each set of color button representations;
   said database means retrieving at least one of said plurality of human behavior patterns corresponding to said set of indicia; and
   said internet access means displaying at least one of said plurality of human behavior patterns contained in said database means.

20. The system of claim 19, wherein said system displays at least one:
   indicia associated with human motivators and power sources based on the selection from said primary color representations;
   indicia associated with how a user reasons in relationships based on the selection from said secondary color representations;
   indicia associated with a user's inner feelings and the underlying force behind the user's hopes and fears based on the selection from said achromatic color representations;
   indicia associated with determining who a user is and what the user wants based on the selection from said primary and secondary color representations; and
   indicia associated with how a user approaches the world and how the user makes requests of others based on the selection from said intermediate color representations.

* * * * *